US005373769A

United States Patent [19]

Sherman

[11] Patent Number: 5,373,769

[45] Date of Patent: Dec. 20, 1994

[54] VARIABLY ADJUSTABLE TREMOLO ANCHOR

[76] Inventor: Gery Sherman, 12808 Teaberry Rd., Wheaton, Md. 20906

[21] Appl. No.: 819,584

[22] Filed: Jan. 9, 1992

Related U.S. Application Data

[63] Continuation-in-part of Ser. No. 710,211, Jun. 4, 1991, abandoned.

[51] Int. Cl.[5] .......... G01D 3/00

[52] U.S. Cl. .......... 84/313

[58] Field of Search .......... 84/313

[56] References Cited

U.S. PATENT DOCUMENTS

| | | | |
|---|---|---|---|
| 2,073,226 | 3/1937 | Schrickel | 84/313 |
| 2,741,146 | 4/1956 | Fender | 84/313 |
| 3,237,502 | 3/1966 | Mosley | 84/313 |
| 3,411,394 | 11/1968 | Jones | 84/313 |
| 3,971,286 | 7/1976 | Borell | 84/298 |
| 4,171,661 | 10/1979 | Rose | 84/313 |
| 4,285,262 | 8/1981 | Scholz | 84/313 |
| 4,304,163 | 12/1981 | Siminoff | 84/314 N |
| 4,453,443 | 6/1984 | Smith | 84/298 |
| 4,453,445 | 6/1984 | Smith | 84/298 |
| 4,457,201 | 7/1984 | Storey | 84/313 |
| 4,497,236 | 2/1985 | Rose | 84/298 |
| 4,517,874 | 5/1985 | Fender | 84/314 N |
| 4,798,119 | 1/1989 | Leifheit | 84/314 N |
| 4,864,909 | 9/1989 | Touey | 84/313 |
| 4,869,145 | 9/1989 | Evans | 84/313 |

OTHER PUBLICATIONS

Hamer Products Brochure, Hamer Guitars U.S.A., Arlington Heights, Ill., pp. 2–3, (1992).

1992 Carvin Product Catalog, Carvin Corp., Escondido, Calif., pp. 27 and 44 (1992).

*Primary Examiner*—Michael L. Gellner

*Assistant Examiner*—Cassandra Spyrou

*Attorney, Agent, or Firm*—Shlesinger Arkwright & Garvey

[57] ABSTRACT

A guitar includes a body, a headstock, and a neck disposed between the body and headstock. There is a tremolo on the body and a tremolo anchoring system attached to the body. A spring is operatively associated with the tremolo and with the tremolo anchoring system for biasing the tremolo for tensioning a string extending between the tremolo and the headstock. A tremolo-level-adjustment member operatively associated with the spring variably fixedly tensions the spring for variably biasing the tremolo for variably tensioning a string extending between the tremolo and the headstock. The tremolo-level-adjustment member includes a pair of nuts, which nuts are spaced apart from each other, and each of which nut is movable relative to the body for variably fixedly tensioning the spring. There is likewise a fastener for use with the present guitar and with existing guitars.

10 Claims, 6 Drawing Sheets

VARIABLY ADJUSTABLE TREMOLO ANCHOR

RELATED PATENTS

This patent is a continuation-in-part of patent application entitled, GUITAR APPARATUS, having Ser. No. 07/710,211 and filing date Jun. 4, 1991, now abandoned.

BACKGROUND OF THE INVENTION

This invention relates to musical instruments known as guitars, and more particularly to guitars equipped with tremolo devices for dynamically altering the pitch of the guitar.

DESCRIPTION OF THE RELEVANT ART

Tremolo devices are well known to those skilled in the musical instruments art for varying the pitch of a guitar. The tremolo is mounted on the body of the guitar and becomes an integral part of the guitar. The guitar strings are held taught at one end by the tremolo. The other end of the strings connect to tuning pegs which are mounted on a headstock. The guitar strings are taut and traverse over the length of the neck of the guitar to the headstock. At the end of the neck, which is connected to the headstock, the strings pass over or through a nut.

While playing a guitar equipped with a tremolo, a guitarist can vary the pitch of the strings by tilting the tremolo arm which increases or decreases string tension.

A common and frustrating problem that exists with all prior art guitars equipped with tremolo devices is that the guitar strings cannot stay in tune during abusive, or even normal, play of the guitar, requiring frequent tuning of the strings.

Several apparatus have been proposed for keeping the guitar in tune while using the tremolo device. U.S. Pat. No. 4,171,661 to Rose discloses a tremolo device which employs a base plate anchored to the body of the guitar. A key to the Rose '661 disclosure is that the base plate for the tremolo device is anchored so that it preferably returns to the position it was located, prior to varying the tremolo device. The Rose '661 patent also uses string restraining assemblies, clamping devices, at the bridge and nut to prevent the strings from sliding across the bridge and nut during use of the tremolo device.

The Rose '661 patent thus describes a technique for maintaining the pitch of the instrument by clamping the strings at the nut and the bridge portion of the tremolo device.

A major problem associated with the disclosure in the Rose '661 patent, recognized in U.S. Pat. No. 4,497,236 to Rose, is the complex tuning procedure necessitated by the system: the clamps at the nut are loosened, the strings are tuned and then the clamps are retightened. This procedure is repeated until all of the strings are properly pitch tuned with all of the clamps tightened.

Another problem associated with Rose '661 tremolo is the poor responsiveness observed during play. The Rose '661 tremolo pivots stiffly and lacks smoothness and precision. When using the Rose '661 tremolo device, the lack of smoothness and precision and other inherent qualities result in a lack of control and fluidity when producing tonal effects and nuances. These same inherent qualities prevent the tremolo device from returning to its original position after and during use, causing the guitar strings to go out of tune.

The poor responsiveness of the Rose '661 tremolo is related, in part, to the friction or interference experienced at the location where the tremolo base plate pivots on the studs. The tapered slots of the base plate makes contact with the head and shoulders of the studs in such a manner that grinding of these respective parts occurs, instead of a clean, sharp, isolated pivoting action.

The disclosure in the Rose '236 patent attempted to address the poor responsiveness and tuning problems associated with Rose '661 by adding a fine tuning mechanism to the clamping devices at the bridge for the strings. The strings on a guitar using the design of the Rose '236 fine tuning mechanism, however, are difficult to keep in tune and played in tune.

There are two types of tuning for a string, both of which are necessary to achieve a properly tuned guitar. The first is called pitch tuning. Pitch tuning is accomplished by increasing or decreasing the tension of the string usually by means of a tuning peg. The higher the string tension, the higher the pitch of the string and conversely the lower the string tension, the lower the pitch of the string.

The second type of string tuning is referred to as harmonic tuning or intonation. Intonation of a string is accomplished by varying the distance between the string's critical contact points at the nut and at the bridge, usually by means of adjustable bridge saddles. The longer the distance between the two critical contact points, the flatter the intonation and conversely the shorter the distance between the two critical contact points, the sharper the intonation.

Hence, for the strings on a guitar to be considered in tune, not only must each string be adjusted to its proper pitch but each string must be adjusted precisely and accurately to its proper length.

The fine tuning mechanism disclosed in the Rose '236 patent incorporates in its structure the bridge element of the guitar which clamps the string and provides the critical contact point for intonation tuning. When the fine tuning mechanism is adjusted to alter the pitch by increasing or decreasing string tension, the bridge saddle pivots about a pin which inherently causes a variation in the distance between the critical contact points. At the same time that the fine tuning mechanism changes the string tension, the length of the string is changed which affects the intonation. The fine tuning mechanism cannot serve its intended function of fine tuning the pitch without simultaneously disrupting the intonation, and the string cannot possibly be tuned by use of the fine tuning mechanism alone. Only a slight variation in the distance of the string between the nut and the bridge causes a loss of intonation.

The guitars disclosed in the Rose '661 patent and the Rose '236 patent have a cumbersome locking nut, which adds complexity to the tuning process and the string changing process. Further, only the tremolo arm varies the pitch on the Rose '661 tremolo and the Rose '236 tremolo.

Another problem associated with the prior art tremolo devices is the design of the tremolo arm assembly, which is supposed to stay tight so that the tremolo arm can remain in a fixed position. Constant swiveling of the arm, in and out of playing position, causes the tremolo arm assembly to loosen which in turn causes the tremolo arm to be unable to stay in a fixed position. Also, prior tremolo arm assemblies are not manufactured with precision and are difficult to tighten and adjust due to deficient design.

A further problem associated with prior art tremolo devices is the means by which the tremolo is attached and secured to the body of the guitar. Prior art tremolo devices use wood screws or their functional equivalent to mount the tremolo to the guitar body. Then the same wood screws are later rotated to adjust the positioning or height of the tremolo. Repeated tightening and loosening of the wood screws to adjust the height or positioning of the tremolo weakens the support that these screws provide and can eventually lead to failure and irreparable damage to the guitar. Also, a weakened support of the tremolo device can cause the strings to go out of tune easily since the tremolo does not always return to the original position after use.

OBJECTS OF THE INVENTION

A general object of the invention is to provide an improved tremolo device for varying the pitch of the strings on a guitar which does not require a fine tuning mechanism or a clamping device at the nut.

A further object of the invention is to improve the responsiveness of the pivoting action of the tremolo device, and the function of the tremolo arm assembly which holds the tremolo arm in a fixed position.

Another object of the invention is to create a tremolo mechanism that permits the guitar strings to be brought into a precise state of tune without variance throughout all ranges of tremolo action and play, and that allows fine tuning of the pitch of a guitar string without altering its intonation.

Another object of the invention is to create an alternate means for varying the pitch of the strings other than using the tremolo arm, and to reduce the complexity of the string changing process, and the complexity of the tuning process.

Another object of the invention is to provide a tremolo device that is simple, effective and easy to use, that has sound structural support, and which allows repeated adjustment or leveling of the tremolo system on the guitar body without affecting the structural integrity of the system.

SUMMARY OF THE INVENTION

According to the present invention, as embodied and broadly described herein, a guitar is provided which has a body, a headstock, a neck, a tremolo and a plurality of strings. The neck connects at a first end to the body and at a second end to the headstock. The plurality of strings stretch from the headstock to the bridge portion of the tremolo.

The present invention includes the elements of the tremolo guitar which allow the guitar to remain in tune during extensive, abusive play and which provide desirable characteristics such as stability, simplicity, responsiveness and precision.

Two tremolo embodiments are presented which achieve the desired result of having a guitar, equipped with a tremolo, which remains in tune during play. The first tremolo embodiment eliminates the requirement for of having a fine tuning mechanism and locking nut by incorporating other components to achieve the desired results. The location and alignment of the locking-tuning pegs and strings, in combination with the low-friction nut, allow the strings to stretch freely during use of the tremolo and return to the original position, preventing the strings from going out of tune.

The first embodiment of a tremolo device may also include extended screws attached to the bridge saddles to clamp the strings of the guitar. These extended screws allow the guitarist to increase the pitch of the guitar without having to use the tremolo arm.

The second tremolo embodiment includes a new fine tuning mechanism and a locking nut. The new fine tuning mechanism, when used with a locking nut, allows the pitch of the strings to be adjusted without altering the intonation of the strings. Thus, the strings are tuned without the complicated process of having to loosen the clamps at the nut, retuning the strings and then retightening the clamps at the nut.

This invention also provides a new tremolo base plate having bevelled-slotted pivot points. The bevelled-slotted pivot points, in combination with specially designed studs, reduce the friction created at the pivot point of the tremolo and provides increased responsiveness and fluidity during play. Also, stud casings are used to improve the structural integrity to the tremolo system. The new tremolo base, studs and stud casings are used cooperatively with the first and second tremolo embodiments.

This invention also includes a new spring claw fastener which allows for simple adjustment of the tremolo system without disturbing the structural integrity of the system. The springs of the tremolo device are connected to a spring claw which is secured to the guitar body by the specially designed spring claw fastener. The new spring claw fastener improves the responsiveness of the tremolo system and also provides a tremolo system with more structurally sound support.

The present invention also includes a new tremolo arm assembly which stays tight, preventing the tremolo arm from rotating freely and interrupting play; is easy to adjust when the tremolo is mounted on the guitar body; and is precisely designed and manufactured to be connected onto the base plate, eliminating both unwanted play in the tilting movement of the tremolo arm and unwanted stiffness in the rotation of the tremolo arm.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1A:
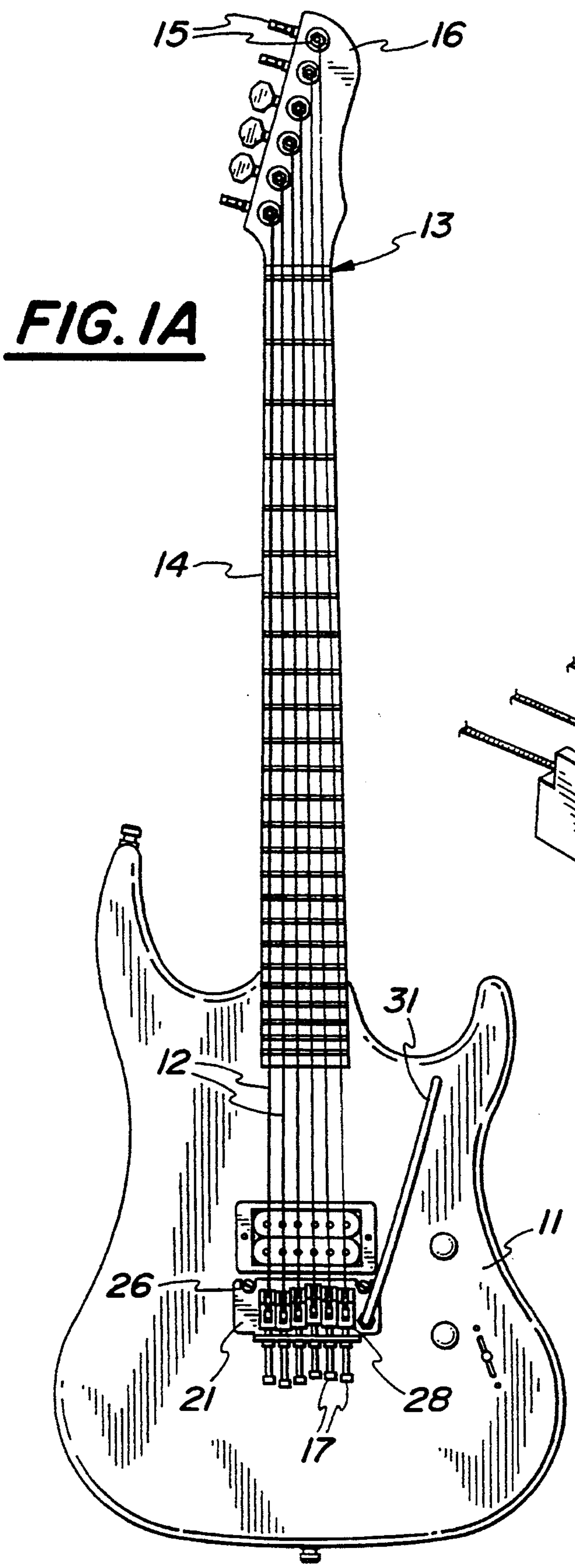
FIG. 1A is a plan view of a guitar without a fine tuning mechanism and locking nut.

Reference will now be made in detail to the present preferred embodiments of the invention, examples of which are illustrated in the accompanying drawings, wherein like reference numerals indicate like elements throughout the several views.

Figure 1B:
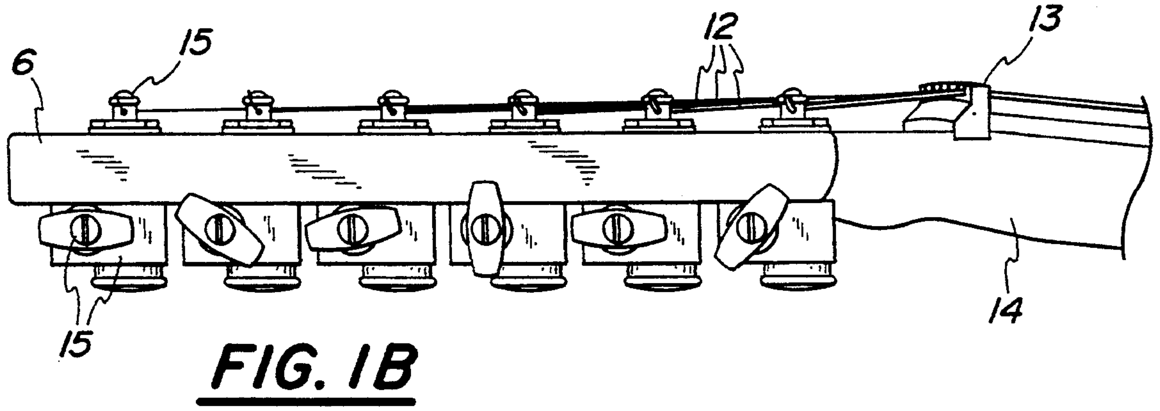
FIG. 1B is a side view of the headstock region of the guitar without a fine tuning mechanism and locking nut.
Figure 2:
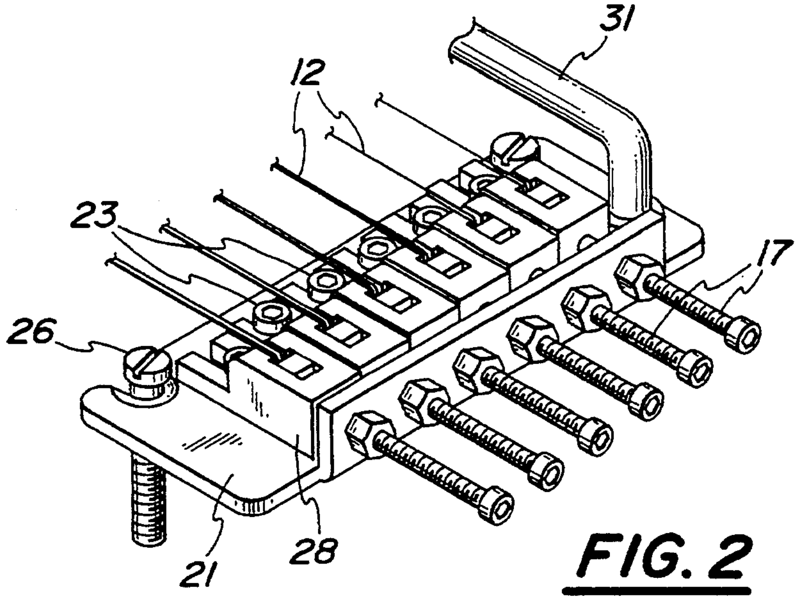
FIG. 2 shows an embodiment of a tremolo device without a fine tuning mechanism.

In the exemplary arrangement shown in FIGS. 1A and 1B, the basic components of the guitar, having a first embodiment of a tremolo device that eliminates the use of a fine tuning mechanism and locking nut at the headstock, are illustrated as a body 11, a headstock 16, a neck 14 connecting at a first end to the body 11 and at a second end to the headstock 16, a plurality of locking-tuning pegs 15 and a plurality of strings 12. FIGS. 1A and 1B also show the nonlocking-low-friction nut 13, the tremolo base plate 21, the tremolo arm 31, the threaded studs 26, the bridge saddles 28, and the long length screws 17.

The plurality of locking-tuning pegs 15 are attached to the headstock 16. The side view of headstock region of the guitar, FIG. 1B, shows the headstock 16 tilted back from the neck 14 at an angle of approximately three degrees and the arrangement of the locking-tuning pegs 15.

By tilting the headstock 16 back from the neck 14 at this low angle, the friction of the strings 12 is minimized across the nonlocking-low-friction nut 13. The angle, however, can not be so low as to allow the strings 12 to lose contact with the nonlocking-low-friction nut 13 or reduce the force of the strings against the nut to the point that undesired sounds result during play.

Figure 5:
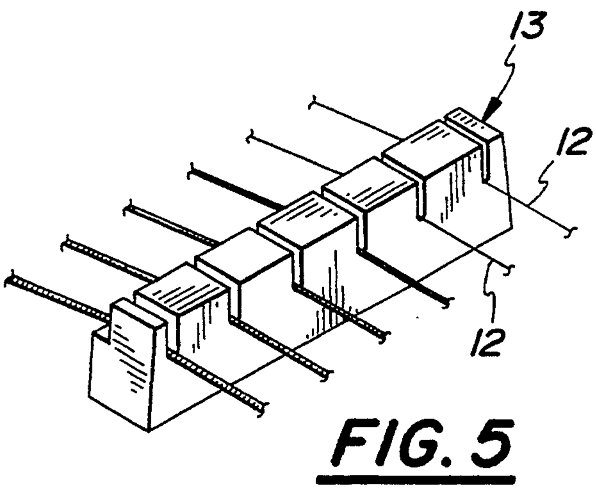
FIG. 5 illustrates a nonlocking-low-friction nut.
Figure 6:
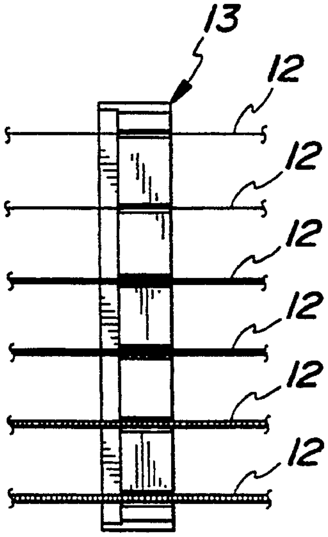
FIG. 6 illustrates a top view of the nonlocking-low-friction nut.

Each end of the plurality of strings 12 passes over the nonlocking-low-friction nut 13 attached to the headstock 16 in a slotted section thereof near the neck 14. The nonlocking-low-friction nut 13 has a plurality of slots with each slot preferably having a flat bottom for passing one of the plurality of strings therethrough. The nonlocking-low-friction nut 13 is shown in FIGS. 5 and 6.

The locking-tuning pegs 15 are attached to the headstock 16 in such a manner with the height of each of the locking-tuning pegs 15 individually determined so that all of the strings 12 have the same angle of less than fifteen degrees across the radius of the nonlocking-low-friction nut 13. Also, the locking-tuning pegs 15 are arranged with the strings 12 running in a straight line and parallel to one another, as viewed from the front of the guitar, from the connection at the locking-tuning pegs 15, across the nonlocking-low-friction nut 13, down the length of the neck 14 and to the bridge saddles 28 located on the base plate 21 of the tremolo device.

During experimentation, the best sound, precision, and responsiveness of the guitar was achieved when the headstock was tilted back from the neck at approximately three degrees and the plurality of strings had the same angle of approximately three degrees across the radius of the nonlocking-low-friction nut. However, exceptional results also are obtained when the headstock is tilted back from the neck at an angle between three degrees and fifteen degrees and the plurality of strings have the same angle, between three degrees and fifteen degrees, across the radius of the nonlocking-low-friction nut. When the headstock is tilted back beyond fifteen degrees from the neck, a noticeable loss in responsiveness and precision is observed.

By having each of the plurality of strings 12 run parallel to one another down the headstock 16 and through the nonlocking-low-friction nut 13, and having each of the strings with the same angle across the radius of the nonlocking-low-friction nut, the friction of the strings 12 is minimized against the nonlocking-low-friction nut and each string experiences approximately the same amount of friction at the nonlocking-low-friction nut. Thus, when the tremolo is used and then deactivated, the tremolo returns to the original position and each string returns to the proper pitch because the strings, experiencing little or no friction at the nonlocking-low-friction nut, are not prevented from moving to their original positions.

Figure 3A:
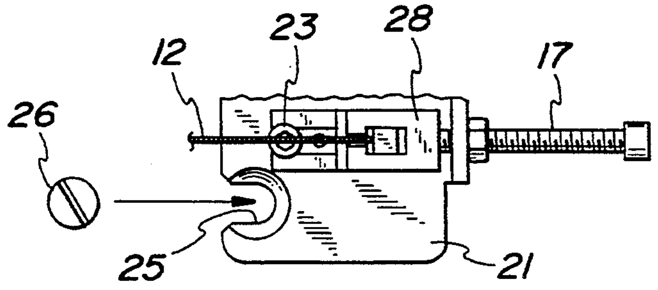
FIG. 3A is a plan view of a portion of the tremolo base plate showing the location of the component parts of the base plate including a bridge saddle, a stud and a bevelled-slotted pivot point.

Referring to FIGS. 2, 3A, 3B, 3C, 3D, 3E, 3F and 4 jointly, the present invention is particularly illustrated with the modifications to the tremolo device of FIG. 3A. Certain components of the tremolo device of FIGS. 2, 3A and 4, without the improvements according to the present invention, were disclosed in U.S. Pat. No. 4,171,661 to Rose, which is incorporated herein by reference.

By using a nonlocking-low-friction nut 13, and eliminating the use of a locking nut or other clamping device at the nut, the guitar can be easily pitch tuned by turning the locking-tuning pegs 15. The intonation of each string, or harmonic tuning, is established or adjusted by moving the corresponding bridge saddle 28 which determines the length of the string between the nonlocking-low-friction nut 13 and the bridge saddle 28.

The tremolo device of FIGS. 2, 3A–3G and 4 comprises a base plate 21, at least two threaded studs 26, a tremolo arm assembly including a tremolo arm 31, a plurality of bridge saddles 28, a plurality of bridge saddle mounting screws 23, a plurality of long length screws 17, a tremolo spring arm 39, a plurality of springs 41, a spring claw 43 and at least two spring claw fasteners 52.

The threaded studs 26 may be screwed into stud casings 44 having appropriate interior threads 44A to receive the threaded studs. The stud casings 44 are held into the wooden block portion 42 within the body of the guitar as is particularly illustrated in FIG. 4. In FIG. 3G, the stud casings 44 have exterior grooves 45 which provide friction for securing the stud casings into the guitar body.

The tremolo base plate 21 is held in place by the bevelled-slotted pivot points 25, having a top bevel 303 and a bottom bevel 302, being forced against the threaded studs 26 by the tension in the strings 12. The bevelled-slotted pivot points 25 of the base plate 21 fit into the V-shaped notch 27 located between the head 26B and the lower flanged shoulder 26A of the threaded studs 26.

Figure 3B:
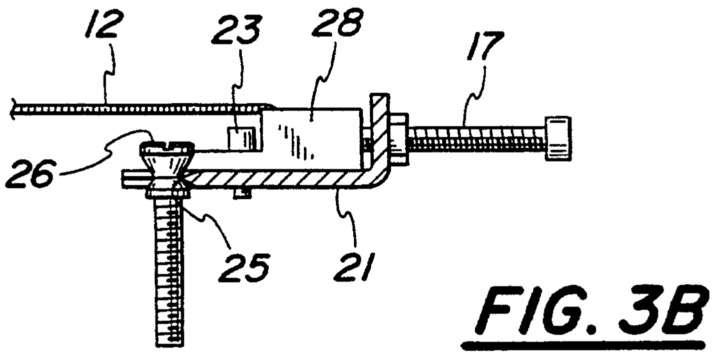
FIG. 3B is a side view of the tremolo base plate and the threaded stud.
Figure 3C:
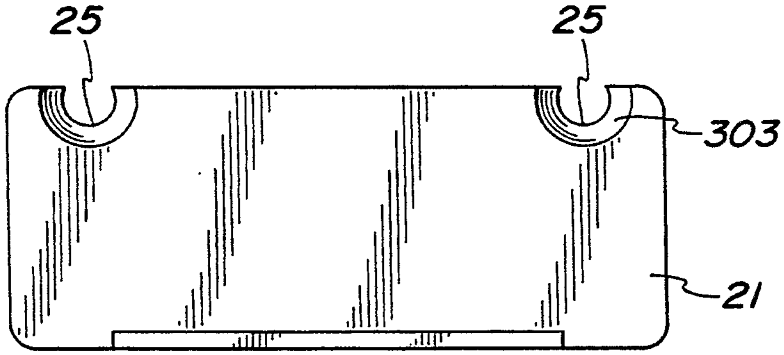
FIG. 3C is a plan view of the tremolo base plate showing the bevelled-slotted pivot points.
Figure 3D:
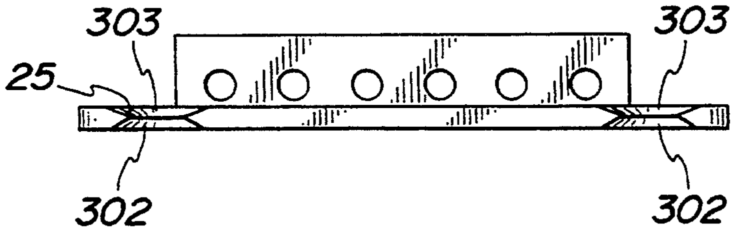
FIG. 3D is a front view of the tremolo base plate showing the top bevel and bottom bevel of the bevelled-slotted pivot points.

FIGS. 3A and 3B illustrate how the bevelled-slotted pivot points 25 of the base plate 21 fit into the V-shaped notches of the threaded studs 26. The V-shaped notches 27 are located between the stud heads 26B and the flanged shoulders 26A of the threaded studs.

Figure 3E:
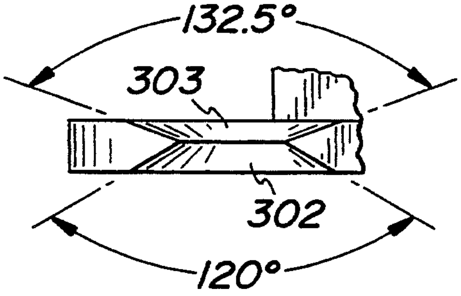
FIG. 3E shows the preferred angles of the top bevel and the bottom bevel.
Figure 3F:
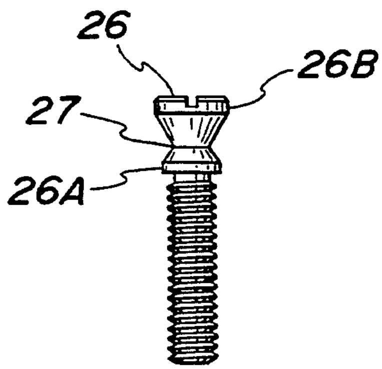
FIG. 3F illustrates a threaded stud having a V-shaped notch.
Figure 3G:
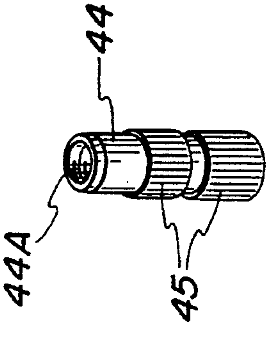
FIG. 3G shows a stud casing having exterior grooves.

Each bevel has the same diameter on the base plate 21. Each diameter of the bevels is slightly larger than the diameter of the V-shaped notches 27 of the threaded studs 26. The base plate, including the bevelled-slotted pivot points which reside on the base plate, in a preferred embodiment, are manufactured from case hardened steel. The top bevel 303 and the bottom bevel 302 create a small, precise, hard and sharp edge which lowers the friction of the bevelled-slotted pivot point 25 within the V-shaped notches 27 of the case hardened, tapered steel studs 26 where the bevelled-slotted pivot point rests. The threaded stud 26 has a V-shaped notch 27 as shown in FIG. 3E.

The bevelling of the bevelled-slotted pivot points, which pivots at the V-shaped notches of the threaded studs, allows for free and precise movement in the tilting direction of the tremolo. When the tremolo is deactivated, the tremolo immediately returns to its original position, maintaining the initial tension and tuning of the strings.

A preferred embodiment the tremolo base plate 21 has bevelled-slotted pivot points 25 which include a top bevel of approximately 132.5 degrees and a bottom bevel 302 of approximately 120 degrees. Also, both the top and bottom bevels have a diameter of approximately 0.450 inches on a base plate 21, which is approximately 13/128 inches thick. Experiments revealed the most outstanding results when these dimensions were used.

Excellent results are obtained when the top bevel 303 ranges from 105 degrees to 160 degrees with a corresponding range in the lower bevel 302 of 105 to 160 degrees. Outstanding results are obtained with the base plate 21 having a thickness ranging from 5/64 to $\frac{1}{8}$ inches.

The object of having a base plate 21 with bevelled-slotted pivot points is to create a small, precise, sharp edge for lowering the friction of the bevelled-slotted pivot point against the V-shaped notch of the corresponding threaded stud upon which the bevelled-slotted pivot point pivots. The angle of the V-shaped notch 27 of the threaded studs 26 must be sufficiently large for allowing the sharp edge of the bevelled-slotted pivot point 25 to fit securely into the V-shaped notch 27 of the threaded stud while preventing any other part of the base plate from making contact with the threaded stud. Accordingly, the only parts of the base plate that contact the threaded studs are the sharp edges of the bevelled-slotted pivot points which only contact the V-shaped notches or grooves of the studs. As a result, less friction, thus greater precision, is achieved with a true pivoting action than with the grinding action that is experienced with the designs found in the prior art.

The tremolo provides the guitarist with an alternate means for varying the pitch of the strings. By pressing the palm of the hand down on the long length screws 17 that extend out past the base plate 21 from the bridge saddles 28, the guitarist may increase the pitch of the strings. This advantage is brought about by using long length screws 17 to clamp the strings 12 in the bridge saddles 28, mounting the tremolo device approximately one quarter to one half inch above the body of the guitar and eliminating the need for a fine tuning mechanism at the bridge.

Prior to the instant invention, resting the hand on the bridge, a very common playing technique, meant coming into contact with the fine tuning mechanism causing the guitar to go out of tune. Because the need for a fine tuning mechanism eliminated by the present invention, the guitarist's hand can rest on the bridge while playing without causing the guitar to go out of tune.

Figure 4:
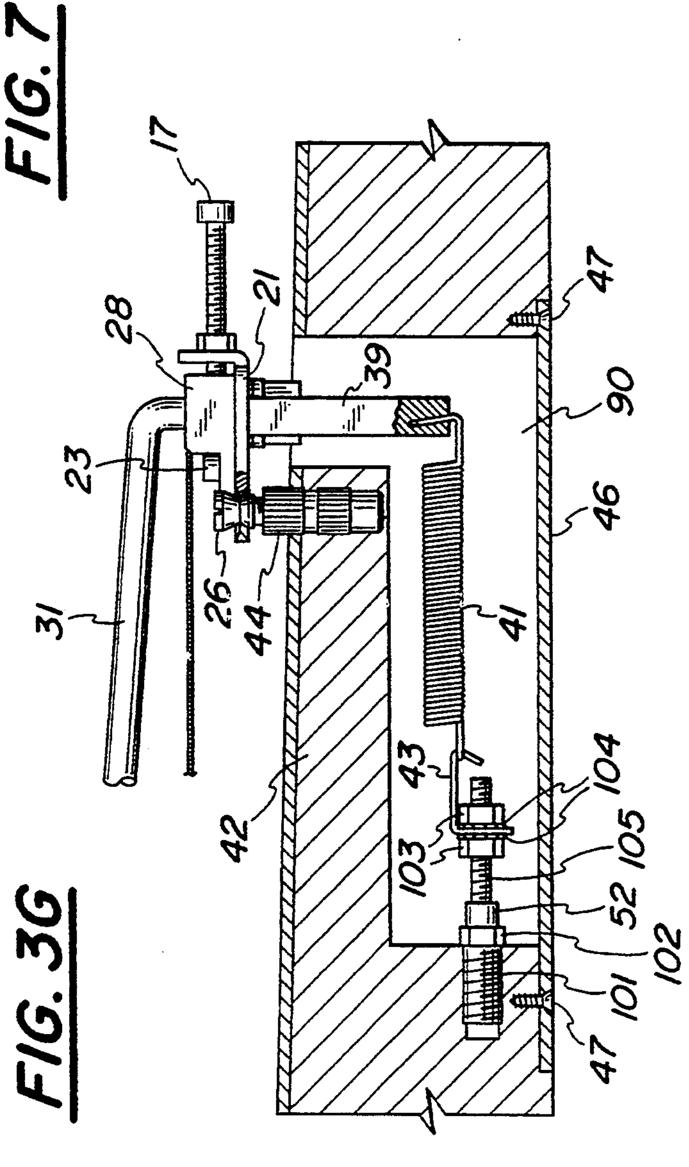
FIG. 4 shows a cross-sectional view of the tremolo device without a fine tuning mechanism.
Figure 9:
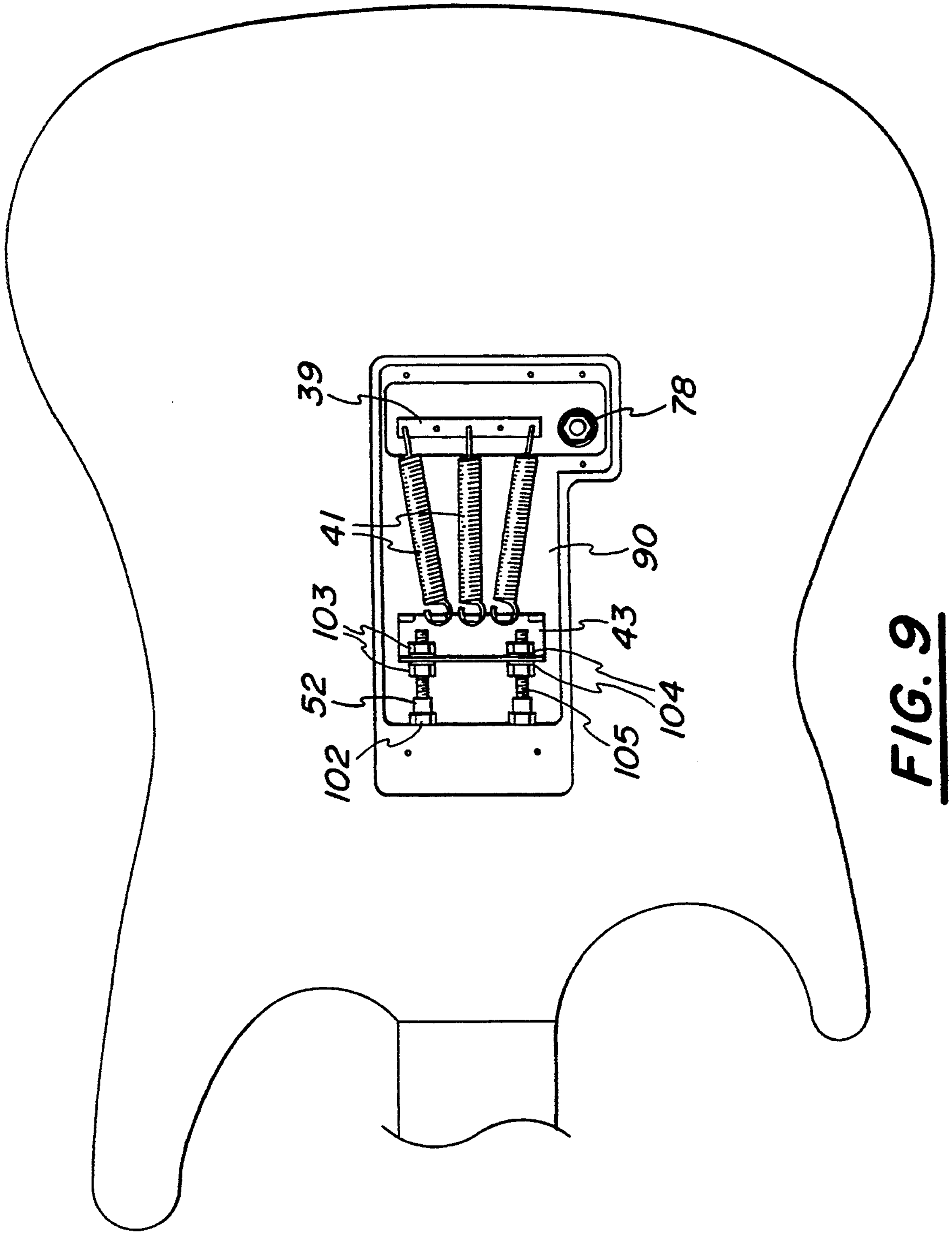
FIG. 9 shows the rear of a guitar body and illustrates a support system of a tremolo and a tremolo arm assembly nut.

The tremolo cavity 90 on the back side of the guitar body, as illustrated in FIGS. 4 and 9, houses the springs 41, the spring claw 43, the spring claw fastener 52, and the spring arm 39 of the tremolo device. The tremolo cavity 90 has two covering plates 46 and 46A made of plastic or other appropriate material. The covering plates 46 and 46A cover the tremolo cavity 90 and are secured to the back of the guitar by screws 47. The covering plates 46 and 46A provide access to the tremolo device and tremolo arm assembly, respectively. Covering plate 46A, not shown in the figures, covers only the portion of the tremolo cavity containing the hexagonal nut 78 of the tremolo arm assembly, which is discussed in detail below.

The tremolo spring arm 39 is fastened onto and beneath the tremolo base plate 21 by screws, or by being formed integrally therewith, or by other appropriate means. The springs 41 are attached at one end to the tremolo spring arm 39 and are held at the other end by a spring claw 43. The spring claw is held in place by a plurality of spring claw fasteners 52.

Figure 10:
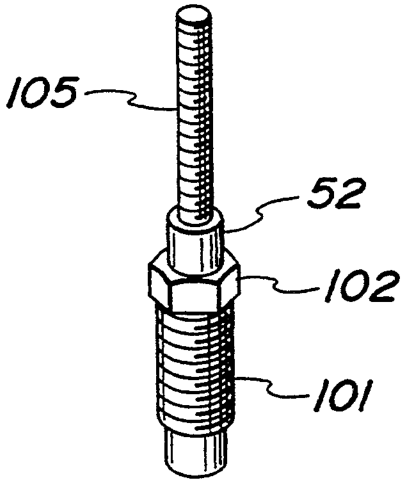
FIG. 10 illustrates a spring claw fastener.

The spring claw fastener 52 is detailed in FIG. 10. The threaded mounting shaft 101 is secured into the body of the guitar. The hexagonal shoulder 102 may be used for installation of the spring claw fastener 52 into the body of the guitar.

The two nuts 103 and two star washers 104 of the spring claw fastener 52 are used to secure the spring claw 43 to the spring claw fastener 52 along the threaded tremolo-level-adjustment shaft 105. Also, the two nuts 103 and two star washers 104 allow adjustment of the position or height of the tremolo device by changing the point of connection of the spring claw 43 along the tremolo-level-adjustment shaft. The connection point of the spring claw 43 along the tremolo-level-adjustment shaft 105 is changed by loosening the nuts 104 and star washers 104 and then retightening them along the tremolo-level-adjustment shaft 105 at the proper location.

The spring claw fasteners 52 provide the structural stability of the tremolo system by mounting the tremolo to the guitar body and resisting the tensional forces created in both the guitar strings 12 and the springs 41. The spring claw fasteners 52 detailed herein represent a tremendous improvement over prior art fasteners, wood screws. Prior art tremolo systems are designed so as to connect the spring claw to the head of the wood screws. The height or positioning of the prior art tremolo is then adjusted by tightening or loosening the wood screw, which could weaken the support the wood screws provide and lead to failure of the tremolo system.

Figure 7:
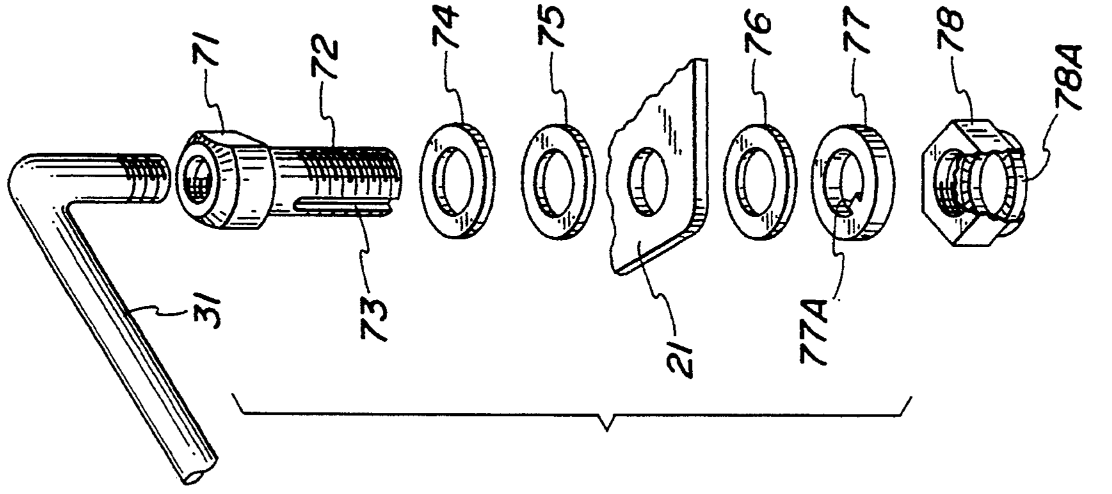
FIG. 7 shows an exploded view of a tremolo arm assembly attached to a base plate.

An exploded view of the new tremolo arm assembly is illustrated in FIG. 7. The tremolo arm 31 is an elongated, cylindrical shaft that bends at one end. At this end of the tremolo arm 31 are threads which connect the tremolo arm 31 into the two flat sided shoulder 71 of the threaded-tremolo-arm-assembly shaft 72. The two flat sided shoulder is used during installation and adjustment of the tremolo arm assembly which is connected to the tremolo base plate 21.

Below the two flat sided shoulder 71 extends the threaded-tremolo-arm-assembly shaft 72, which has a key-way groove 73 running along the length of the threaded-tremolo-arm-assembly shaft. The key-way groove 73 is cut out of the threads of the threaded-tremolo-arm-assembly shaft 72 and has a depth greater than the depth of the threads of the threaded-tremolo-arm-assembly shaft 72. Also, the width of the key-way groove 73 is greater than the distance between the threads of the threaded-tremolo-arm-assembly shaft 72.

A solid washer 74 is placed along the threaded-tremolo-arm-assembly shaft 72 below the hexagonal shoulder 71. Below the solid washer 74, a first washer 75, made of highly resistant material having low friction, is placed along the threaded-tremolo-arm-assembly shaft 72. The threaded-tremolo-arm-assembly shaft 72 is then placed through the base plate 21. Below the base plate 21 and along the threaded-tremolo-arm-assembly shaft 72, a second washer 76 made of highly resistant material having low friction is placed.

Below the second washer 76, the key-way washer 77 is placed along the threaded-tremolo-arm-assembly shaft 72 with the key portion 77A fitting into the key-way groove 73. The key portion 77A of the key-way washer 77 is wider than the distance between the threads of the threaded-tremolo-arm-assembly shaft 72 and extends into the key-way groove 73 at a depth that is greater than the depth of the threads of the threaded-tremolo-arm-assembly shaft 72. The dimensions of the key portion 77A and the key-way groove 73 prevent the key portion of the key-way washer from sliding into the threads of the threaded-tremolo-arm-assembly shaft 72. Thus, the key-way washer 77 helps prevent the tremolo arm assembly from becoming loose during use of the tremolo and interfering with the guitarist.

A hexagonal nut 78, with a plastic insert 78A, is then screwed into the threaded-tremolo-arm-assembly shaft 72. The plastic insert 78A of the hexagonal nut 78 provides increased friction of the nut against the threaded-tremolo-arm-assembly shaft 72. The hexagonal nut 78 is then tightened as desired.

Once installed, the tremolo arm assembly can be adjusted easily from the back of the guitar by removing the covering plate, 46A and placing a socket over the hexagonal nut 78 while placing a wrench over the two flat sided shoulder 71. Thus, the tremolo arm is easily adjusted without damaging the front of the guitar body. The new tremolo arm assembly stays tight, preventing the tremolo arm 31 from interrupting play, and also eliminates unwanted play in the tilting movement of the tremolo arm and unwanted stiffness in the rotation of the tremolo arm.

The present invention with the aforementioned structural changes to the guitar disclosed in the Rose '661 patent has several advantages. String changing is simpler, easier, less complex and cumbersome. This advantage is brought about by eliminating the locking nut and the use of locking-tuning pegs. Also, the tremolo arm does not loosen up when repeatedly swiveled in and out of playing position and stays in a fixed position, due to the improved design of the locking tremolo arm assembly which holds the tremolo arm in a fixed position.

The tuning process is simpler and less complex with the first embodiment of the tremolo device and assorted improvements of the present invention. Additionally, the guitar strings can be maintained in a highly precise state of tune without variance throughout all ranges of tremolo action and play. These advantages result from eliminating the need for a fine tuning mechanism, improving the responsiveness of the tremolo device, eliminating the clamping device at the nut, using a nonlocking-low-friction nut, having a low headstock angle, including locking-tuning pegs, aligning each string parallel to each other from the tremolo to the tuning pegs and individually determining the height of each tuning peg so as to have the same angle of the strings across the radius of the non-locking-low-friction nut.

With the improvements of the present invention, the existing range of producible tonal effects and nuances is also improved and enhanced with a more vocal musical quality to them, from the improved responsiveness of the pivoting action of the tremolo device.

Figure 8:
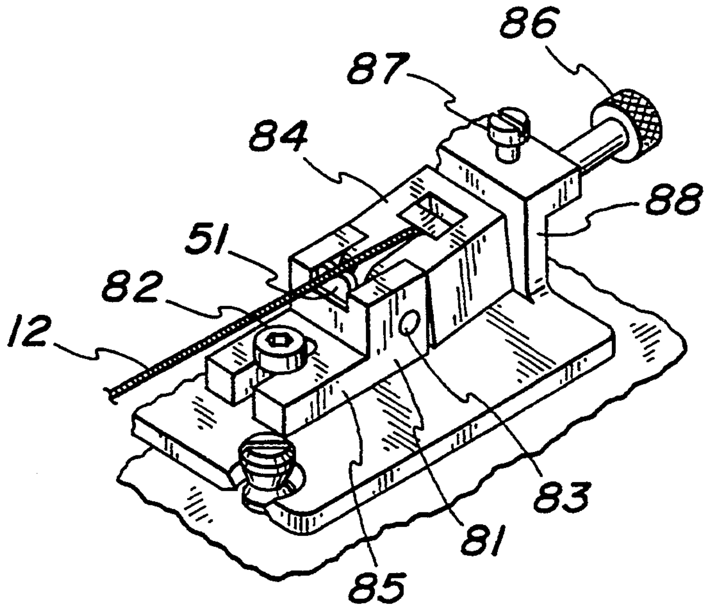
FIG. 8 shows a fixed intonation point on a fine tuning mechanism.

FIG. 8 illustrates the fine tuning mechanism of the second embodiment of a tremolo device. The improved fine tuning mechanism in FIG. 8 serves its intended function of fine tuning the pitch without disrupting the intonation. This is possible because the improved fine tuning mechanism of FIG. 8 has a fixed intonation point 51 built into it as an integral part of its design. This underscores the ability of the guitar to be brought into a precise state of tune. The fine tuning mechanism of FIG. 8 is an improvement and modification of a fine tuning mechanism disclosed in U.S. Pat. No. 4,497,236 to Rose, which is incorporated herein by reference.

The fine tuning mechanism is used to adjust or fine tune the pitch of the string 12 by increasing or decreasing string tension. A fine tuner bridge saddle 81 is attached to the tremolo base plate 21 by a bridge saddle mounting screw 82. The fine tuner bridge saddle 82 pivots between the forward portion and the rear portion 84 along the pin 83.

A string 12 connects at one end to a tuning peg and is clamped in a locking nut at the headstock, traverses the length of the neck, passes over the fixed intonation point 51, and is clamped into the rear portion 84 of the bridge saddle 81. The bridge saddle clamping screw 86 extends from the back of the rear portion 84 and through a slot in the base plate shoulder 88. The bridge saddle clamping screw 86 is tightened to clamp the string 12 securely into the rear portion 84.

The tension on the string 12 creates a force which pulls the rear portion 84 forward toward the neck of the guitar and upward from the base plate 21. The fine tuning adjustment screw 87 is threaded through the horizontal portion of the base plate shoulder 88 and is positioned to make contact with the non-threaded portion of the bridge saddle clamping screw 86.

The string can thus be fine tuned by threading the fine tuning adjustment screw 87. Threading the fine tuning adjustment screw 87 upward results in an upward movement of the bridge saddle clamping screw 86 and the rear portion 84, which in turn causes the pitch of the string 12 to lower as the tension in the string is decreased. Threading the fine tuning adjustment screw 87 downward results in a downward movement of the bridge saddle clamping screw 86 and the rear portion 84, which in turn causes the pitch of the string 12 to increase as the tension in the string is increased.

The fixed intonation point 51 is positioned in the forward portion 85 of the fine tuning mechanism and makes contact with the string 12 at a level above the level at which the string 12 is clamped into the rear portion 84. Because the forward portion 85 and the fixed intonation point 51 remain stationary during adjustment of the fine tuning adjustment screw 87, the length of the string between the critical contact points, the locking nut at the headstock and the fixed intonation point 51, remains constant. Thus, the intonation, or harmonic tuning, of the string 12 is not altered during fine tuning of the pitch of the string.

It will be apparent to those skilled in the art that various modifications can be made to the improved tremolo devices of the instant invention without departing from the scope or spirit of the invention, and it is intended that the present invention cover modifications and variations of the improved tremolo devices provided they come within the scope of the appended claims and their equivalents.

I claim:

1. A fastener for use with a tremolo device, said fastener comprising:

a) a mounting shaft configured for being mounted on a body of a guitar;

b) a threaded tremolo-level-adjustment shaft disposed on said mounting shaft; and c) a spring claw movably disposed on said threaded tremolo-level-adjustment shaft; and d) a pair of nuts movably attached to said threaded tremolo-level-adjustment shaft, said pair of nuts being spaced apart, said spring claw being at least partially disposed between said pair of nuts, and each one of said pair of nuts being configured for independent movement relative to each other and along said threaded tremolo-level-adjustment shaft for adjusting a position of said spring claw relative to said threaded tremolo-level-adjustment shaft.

2. A fastener for use with a tremolo device as defined in claim 1, wherein:

a) said mounting shaft includes threads configured for engaging a body of a guitar.

3. A fastener for use with a tremolo device as defined in claim 1, wherein:

a) said threaded tremolo-level-adjustment shaft is substantially axially aligned with said mounting shaft.

4. A fastener for use with a tremolo device and for providing structural integrity to a tremolo device, said fastener comprising:

a) a mounting member configured for being mounted on a body of a guitar; and b) means disposed on said mounting member for adjusting a tremolo device and for providing structural integrity when a tremolo device is mounted on a guitar and is associated with said adjusting means; and c) said adjusting means includes a threaded shaft, a spring claw disposed on said shaft, a pair of nuts freely movably disposed on said shaft for variably fixedly adjusting the position of said spring claw relative to said threaded shaft, said pair of nuts being spaced apart, each one of said pair of nuts being independently movable relative to each other and along said shaft, and said spring claw being disposed between said pair of nuts.

5. A guitar, comprising:

a) a body;

b) a headstock;

c) a neck disposed between said body and said headstock;

d) a tremolo disposed on said body;

e) a tremolo anchoring system attached to said body;

f) a spring disposed between said tremolo and tremolo anchoring system for biasing said tremolo for tensioning a string extending between said tremolo and said headstock;

g) a tremolo-level-adjustment member disposed adjacent to and operatively associated with said spring for variably fixedly tensioning said spring for variably biasing said tremolo for variably tensioning a string extending between said tremolo and said headstock; and h) a pair of nuts disposed adjacent to and operatively contacting a part of said tremolo-level-adjusting member, said pair of nuts being spaced apart, said part of said tremolo-level-adjustment member being disposed between said pair of nuts, and each said nut being configured for independent movement relative to each other and relative to said body for variably fixedly adjusting the position of said tremolo-level-adjustment member for variably fixedly tensioning said spring.

6. A guitar as defined in claim 5, wherein:

a) said tremolo anchoring system includes a mounting shaft variably fixedly attached to said body.

7. A guitar as defined in claim 6, wherein:

a) said tremolo anchoring system includes a threaded tremolo-level-adjustment shaft disposed on said mounting shaft.

8. A guitar as defined in claim 7, wherein:

a) at least one nut of said pair of nuts is movably disposed on said threaded tremolo-level-adjustment shaft and said at least one nut is configured for movement along said tremolo-level-adjustment shaft for variably fixed adjustment of said tremolo device by variably fixedly adjusting said spring relative to said threaded tremolo-level-adjustment shaft for variably tensioning said spring.

9. A guitar, comprising:

a) a body;

b) a headstock;

c) a neck disposed between said body and said headstock;

d) a tremolo disposed on said body;

e) a tremolo anchoring system disposed on said body;

f) a spring disposed adjacent to and operatively associated with said tremolo and with said tremolo anchoring system for biasing said tremolo for tensioning a string extending between said tremolo and said neck;

g) a tremolo-level-adjustment means disposed adjacent to and operatively associated with said spring for variably fixedly tensioning said spring for variably biasing said tremolo for variably tensioning a string extending between said tremolo and said headstock; and h) said tremolo-level-adjustment means including a tremolo-level-adjustment member and a pair of locking elements, said pair of locking elements being spaced apart, a part of said tremolo-level-adjustment member being disposed between said pair of locking elements, and each one of said pair of locking elements being configured for independent movement relative to each other and relative to said body for variably fixedly tensioning said spring.

10. A guitar as defined in claim 9, wherein:

a) said tremolo-level-adjustment means includes a threaded tremolo-level-adjustment shaft;

b) said tremolo-level-adjustment member includes a spring claw disposed between and operatively connecting said spring with said threaded tremolo-level-adjustment shaft;

c) said pair of locking elements includes a pair of nuts; and d) said pair of nuts is movably disposed on said threaded tremolo-level-adjustment shaft, and said pair of nuts surrounds a part of said spring claw for positively locking said spring claw relative to said tremolo-level-adjustment shaft.

* * * * *